US012306570B2

(12) United States Patent
Okawa et al.

(10) Patent No.: US 12,306,570 B2
(45) Date of Patent: May 20, 2025

(54) IMAGE FORMING APPARATUS HAVING CIRCUIT BOARD TO CONVERT SUPPLIED CURRENT

(71) Applicant: CANON KABUSHIKI KAISHA, Tokyo (JP)

(72) Inventors: Yuichiro Okawa, Tokyo (JP); Kohei Koguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/334,259

(22) Filed: Jun. 13, 2023

(65) Prior Publication Data

US 2023/0324843 A1 Oct. 12, 2023

Related U.S. Application Data

(63) Continuation of application No. 17/355,956, filed on Jun. 23, 2021, now Pat. No. 11,762,322.

(30) Foreign Application Priority Data

Jun. 29, 2020 (JP) ................................ 2020-111995

(51) Int. Cl.
*G03G 15/00* (2006.01)
*G03G 15/04* (2006.01)
*G03G 21/16* (2006.01)

(52) U.S. Cl.
CPC ....... *G03G 15/80* (2013.01); *G03G 15/04072* (2013.01); *G03G 15/6552* (2013.01); *G03G 15/757* (2013.01); *G03G 21/1619* (2013.01)

(58) Field of Classification Search
CPC ............ G03G 15/80; G03G 15/04072; G03G 15/6552; G03G 15/757; G03G 21/1619
See application file for complete search history.

(56) References Cited

U.S. PATENT DOCUMENTS 5,559,581 A * 9/1996 Sugiura ............ G03G 15/6561 399/111
8,447,205 B2 * 5/2013 Eom .................... G03G 15/80 399/88

(Continued)

FOREIGN PATENT DOCUMENTS

CN 1701282 A 11/2005
CN 1909584 A 2/2007

(Continued)

*Primary Examiner* — Sandra Brase
(74) *Attorney, Agent, or Firm* — Canon U.S.A., Inc., IP Division

(57) ABSTRACT

An image forming apparatus according to the present invention includes an optical box, a housing having a discharge opening, a cover provided downstream of the optical box in a discharge direction in which a recording material is discharged through the discharge opening and forming a part of the housing, and a circuit board, wherein the circuit board includes a plurality of electronic components and a wiring board configured to electrically connect the plurality of electronic components, the circuit board is disposed in such a direction that a surface of the wiring board on which the plurality of electronic components is mounted intersects the discharge direction, and the wiring board is provided between the cover and the optical box in the discharge direction, and wherein, when viewed in a vertical direction, the optical box and the plurality of electronic components partially overlap each other.

25 Claims, 10 Drawing Sheets

(56) References Cited

U.S. PATENT DOCUMENTS

| | | | | |
|---|---|---|---|---|
| 11,762,322 | B2 * | 9/2023 | Okawa | G03G 21/1619 347/247 |
| 2004/0051769 | A1 * | 3/2004 | Tsusaka | B41J 29/02 347/108 |
| 2004/0096229 | A1 * | 5/2004 | Yoshihara | G03G 15/2039 399/33 |
| 2009/0035007 | A1 * | 2/2009 | Eom | G03G 15/80 399/88 |
| 2010/0124018 | A1 | 5/2010 | Yoshida | |
| 2016/0187834 | A1 * | 6/2016 | Matsuno | G03G 15/80 399/92 |
| 2018/0150024 | A1 * | 5/2018 | Takahashi | G03G 15/80 |

FOREIGN PATENT DOCUMENTS

| | | | |
|---|---|---|---|
| CN | 101126913 | A | 2/2008 |
| CN | 101738891 | A | 6/2010 |
| CN | 107505817 | A | 12/2017 |
| JP | H06317960 | A | 11/1994 |
| JP | 2004077788 | A | 3/2004 |
| JP | 2004093708 | A | 3/2004 |
| JP | 2010123625 | A | 6/2010 |
| JP | 2015191172 | A | 11/2015 |
| JP | 2018084734 | A | 5/2018 |
| JP | 2018126001 | A | 8/2018 |
| KR | 960006138 | A | 2/1996 |

* cited by examiner

IMAGE FORMING APPARATUS HAVING CIRCUIT BOARD TO CONVERT SUPPLIED CURRENT

CROSS-REFERENCE TO RELATED APPLICATIONS

The present application is a continuation of U.S. patent application Ser. No. 17/355,956, filed on Jun. 23, 2021, which claims priority from Japanese Patent Application No. 2020-111995 filed Jun. 29, 2020, which are hereby incorporated by reference herein in their entireties.

BACKGROUND OF THE INVENTION

Field of the Invention

The present invention relates to an image forming apparatus that forms an image on a recording material.

Description of the Related Art

Inside an image forming apparatus, such as a printer or a copying machine, many components, such as a circuit board and a motor, are mounted. The publication of Japanese Patent Application Laid-Open No. 2016-20932 discusses a configuration in which the placement positions of components, such as a low-voltage power source unit, a high-voltage power source unit, and a motor are elaborated, to downsize an image forming apparatus.

The configuration discussed in the publication of Japanese Patent Application Laid-Open No. 2016-20932 sufficiently satisfies the size of an image forming apparatus desired at that time. In recent years, however, further downsizing of an image forming apparatus is required.

SUMMARY OF THE INVENTION

The present invention is directed to meeting further user demand.

According to an aspect of the present invention, an image forming apparatus includes an optical box including a light source configured to emit light to an image bearing member, a housing including the optical box inside and having a discharge opening through which a recording material is discharged, a cover provided on an end surface of the housing on a downstream side in a discharge direction in which the recording material is discharged through the discharge opening formed in the housing, disposed downstream of the optical box in the discharge direction, and forming a part of the housing, and a circuit board configured to convert an alternating current supplied from an external power source into a direct current and supply power to the light source, wherein the circuit board includes a plurality of electronic components and a wiring board configured to electrically connect the plurality of electronic components, the circuit board is disposed in such a direction that a surface of the wiring board on which the plurality of electronic components is mounted intersects the discharge direction, and the wiring board is provided between the cover and the optical box in the discharge direction, and wherein, when viewed in a vertical direction, the optical box and the plurality of electronic components partially overlap each other.

According to another aspect of the present invention, an image forming apparatus includes an optical box including a light source configured to emit light to an image bearing member, a housing including the optical box inside and having an opening through which a recording material is inserted, a feeding member configured to feed the recording material inserted through the opening in a feeding direction, a cover provided on an end surface of the housing on a same side as a side where the opening is formed, disposed upstream of the optical box in the feeding direction, and forming a part of the housing, and a circuit board configured to convert an alternating current supplied from an external power source into a direct current and supply power to the light source, wherein the circuit board includes a plurality of electronic components and a wiring board configured to electrically connect the plurality of electronic components, the circuit board is disposed in such a direction that a surface of the wiring board on which the plurality of electronic components is mounted intersects the feeding direction, and the wiring board is provided between the cover and the optical box in the feeding direction.

According to yet another aspect of the present invention, an image forming apparatus includes an optical box including a light source configured to emit light to an image bearing member, a housing including the optical box inside and having a discharge opening through which a recording material is discharged, and, a circuit board configured to convert an alternating current supplied from an external power source into a direct current and supply power to the light source, wherein the circuit board includes a plurality of electronic components and a wiring board configured to electrically connect the plurality of electronic components, and the circuit board is disposed in such a direction that a surface of the wiring board on which the plurality of electronic components is mounted intersects a discharge direction in which the recording material is discharged through the discharge opening, and wherein, when viewed in a direction orthogonal to the discharge direction, the optical box and the plurality of electronic components partially overlap each other.

Further features of the present invention will become apparent from the following description of exemplary embodiments with reference to the attached drawings.

DESCRIPTION OF THE EMBODIMENTS

With reference to the drawings, an exemplary embodiment for carrying out this invention will be described in detail in an illustrative manner based on exemplary embodiments below. However, the dimensions, the materials, the shapes, and the relative arrangement of components described in this exemplary embodiment should be appropriately changed according to the configuration of an apparatus to which the invention is applied, or various conditions. That is, the scope of the invention is not limited to the following exemplary embodiment. Each of the embodiments of the present invention described below can be implemented solely or as a combination of a plurality of the embodiments or features thereof where necessary or where the combination of elements or features from individual embodiments in a single embodiment is beneficial.

[Overall Configuration of Image Forming Apparatus]

The overall configuration of an image forming apparatus 1 according to the present exemplary embodiment is described. The image forming apparatus 1 according to the present exemplary embodiment is a monochrome laser beam printer using an electrophotographic process and forms an image on a recording material P using a developer (toner) according to image information transmitted from an external device, such as a personal computer. Examples of the recording material P include a recording sheet, a label sheet, an overhead projector (OHP) sheet, and cloth.

In the following description, the height direction (a direction opposite to a vertical direction) of the image forming apparatus 1 in a case where the image forming apparatus 1 is installed on a horizontal surface is a Z-direction. A direction intersecting the Z-direction and parallel to the axis direction (a main scanning direction) of a photosensitive drum 11 is an X-direction. A direction intersecting the X-direction and the Z-direction is a Y-direction. It is desirable that the X-direction, the Y-direction, and the Z-direction should perpendicularly intersect each other. For convenience, the positive side in the X-direction is referred to as a "right side", and the negative side in the X-direction is referred to as a "left side". The positive side in the Y-direction is referred to as a "front side" or a "front surface side", and the negative side in the Y-direction is referred to as a "back side" or a "back surface side". The positive side in the Z-direction is referred to as an "upper side", and the negative side in the Z-direction is referred to as a "lower side".

Figure 1:
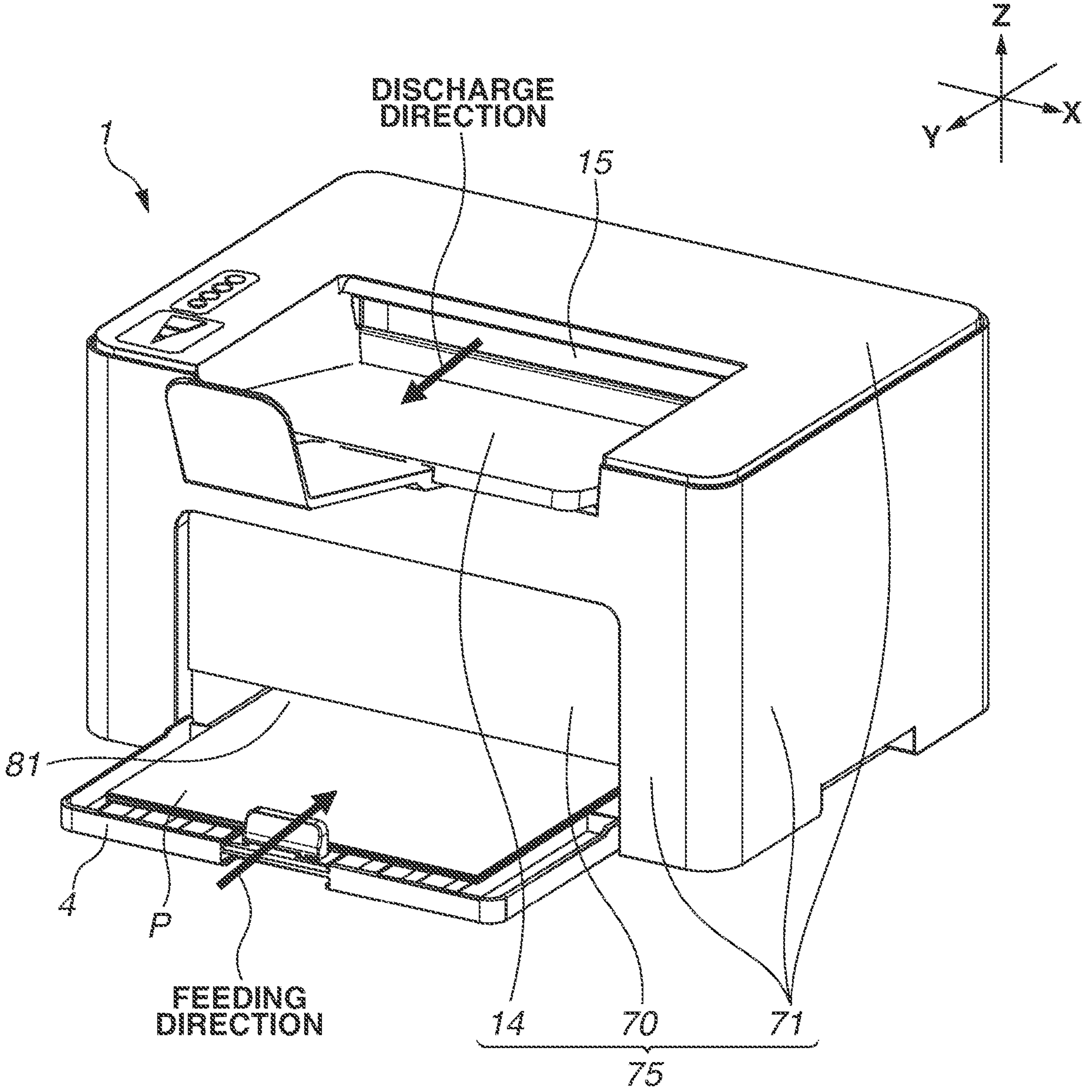
FIG. 1 is a perspective view of an image forming apparatus.
Figure 2:
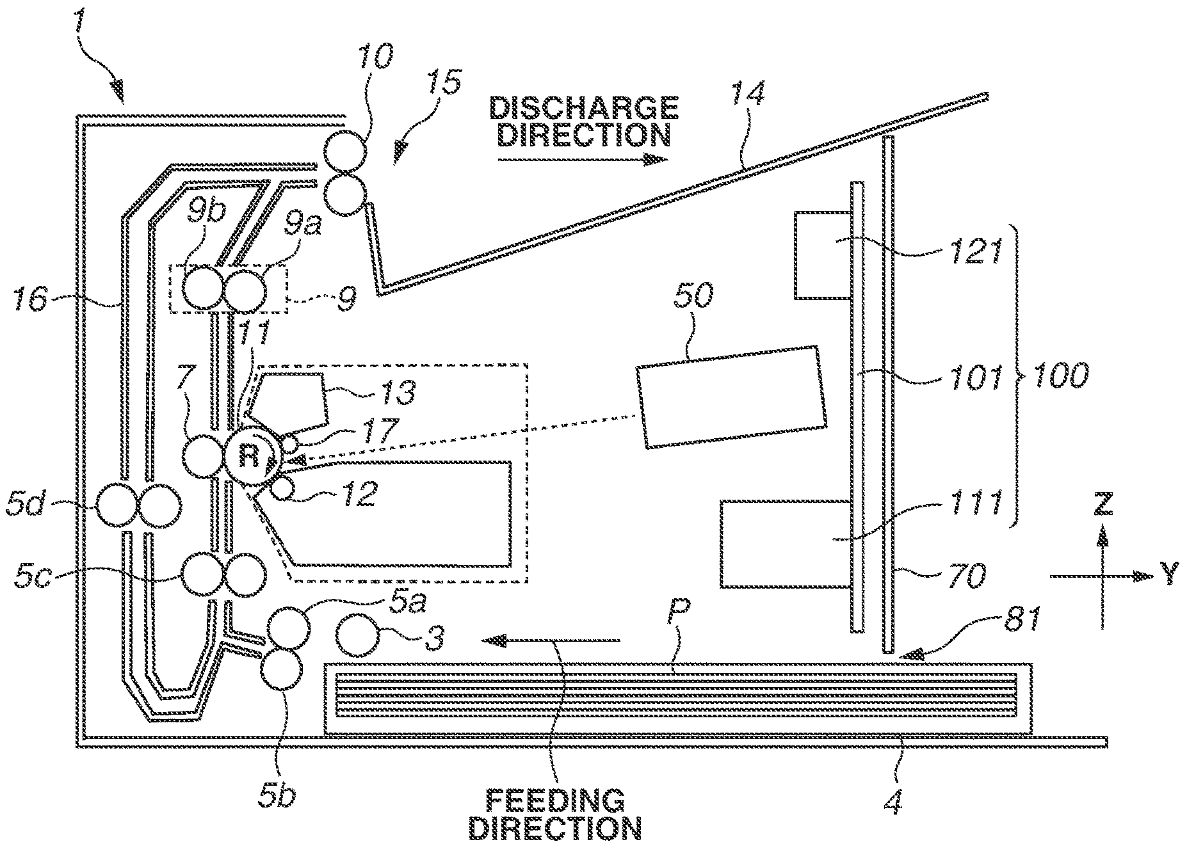
FIG. 2 is a cross-sectional view of the image forming apparatus.

FIG. 1 illustrates a perspective view of the image forming apparatus 1. FIG. 2 illustrates a cross-sectional view of the image forming apparatus 1 along a plane perpendicular to the X-direction (the rotational axis direction of the photosensitive drum 11). In FIG. 1, the image forming apparatus 1 includes a feeding cassette 4 in which recording materials P are stored, and a discharge tray 14 in which a discharged recording material P is stacked. The feeding cassette 4 is inserted through a feeding opening 81, and thus the recording materials P stored in the feeding cassette 4 can be fed to the inside of the image forming apparatus 1. The feeding cassette 4 can be pulled out in the Y-direction from the feeding opening 81, and a user can replenish recording materials P. A recording material P which is fed from the feeding cassette 4 and on which an image is formed is discharged in a discharge direction (the Y-axis positive direction) illustrated in FIG. 1 through a discharge opening 15 and stacked in the discharge tray 14.

In a part of the side surface (a part of a front surface) of the image forming apparatus 1 on the downstream side in the discharge direction, a front cover 70 is provided and covers a circuit board 100. In a part of the front surface other than the portion where the front cover 70 is provided and on side surfaces and a top surface of the image forming apparatus 1, an exterior cover 71 is provided. The front cover 70, the exterior cover 71, and the discharge tray 14 form a housing 75 of the image forming apparatus 1 together. The housing 75 is a member covering the image forming apparatus 1 and includes process members, such as an optical box 50 inside. The feeding opening 81 and the discharge opening 15 are openings formed in parts of the housing 75. A recording material P is inserted to inside the image forming apparatus 1 through the feeding opening 81, and a recording material P is discharged to outside the image forming apparatus 1 through the discharge opening 15. The recording material P is fed into the image forming apparatus in a feeding direction (or predetermined direction).

With reference to the cross-sectional view in FIG. 2, the procedure of an image forming operation on a recording material P is described. In response to transmission of image information to the image forming apparatus 1, the photosensitive drum (or image bearing member) 11 that is a rotating member is rotationally driven at a predetermined peripheral velocity (a process speed) in the direction of an arrow R, based on a print start signal. Based on the input image information, the optical box 50 emits laser light toward the photosensitive drum 11. The optical box 50 is a box-shaped unit including inside members, such as a laser oscillator that outputs laser light, a polygon mirror and a lens for irradiating the photosensitive drum 11 with the laser light, and a scanner motor that rotates the polygon mirror. The photosensitive drum 11 is charged in advance by a charging roller 17 and is irradiated with the laser light, and thus an electrostatic latent image is formed on the photosensitive drum 11. Then, a developing roller 12 develops the electrostatic latent image with toner, and thus a toner image is formed on the photosensitive drum 11.

In parallel with the above described image forming process, a recording material P is fed from the feeding cassette 4. On a conveying path of the image forming apparatus 1, a pickup roller 3, a feeding roller 5*a*, and a conveying roller pair 5*c* are provided. The pickup roller 3 (a feeding member) comes into contact with a recording material P at the top of the recording materials P stored in the feeding cassette 4 and itself rotates, to feed the recording material P in a feeding direction (the Y-axis negative direction). The feeding roller 5*a* and a separation pad 5*b* that is in pressure contact with the feeding roller 5*a* form a separation nip. In a case where a plurality of recording materials P is fed to the separation nip by a frictional force between recording materials P, the feeding roller 5*a* and the separation pad 5*b* separate the plurality of recording materials P and feed only a recording material P at the top to the downstream side.

The recording material P fed from the feeding cassette 4 is conveyed toward a transfer roller 7 by the conveying roller pair 5*c*. A transfer bias is applied to the transfer roller 7, to transfer the toner image formed on the photosensitive drum 11 to the recording material P. The recording material P to which the toner image is transferred by the transfer roller 7 is subjected to a heating/pressurization process by a fixing device 9, and thus the toner image is fixed to the recording material P. The fixing device 9 includes a heating roller 9*a* that has a built-in heater (not illustrated), and a pressure roller 9*b* that is biased toward the heating roller 9*a*. Then, the recording material P to which the toner image is fixed is discharged to the discharge tray 14 by a discharge roller pair 10.

In a case where images are formed on both sides of the recording material P, the discharge roller pair 10 switches back the recording material P, on a first surface of which the image is formed, to guide the recording material P to a two-sided conveying path 16. The recording material P guided to the two-sided conveying path 16 is conveyed toward the transfer roller 7 again by a two-sided conveying roller pair 5*d*. After an image is formed on a second surface of the recording material P by the transfer roller 7, the recording material P is discharged to outside the image forming apparatus 1 by the discharge roller pair 10. After the toner image is transferred to the recording material P, toner remaining on the photosensitive drum 11 is cleaned by a cleaning unit 13.

As illustrated in FIG. 2, the image forming apparatus 1 includes the circuit board 100. The circuit board 100 includes a wiring board 101 made of an insulator and electronic components 111 and 121 soldered to the wiring board 101. On and inside the board of the wiring board 101, conductor wiring is provided, and thus, the electronic components 111 and 121 are electrically connected together. The circuit board 100 has a function of converting an alternating current supplied from outside the image forming apparatus 1 into a direct current and converting an input voltage to obtain a predetermined voltage value required for the image forming process.

As illustrated in FIG. 2, the circuit board 100 is disposed in such a direction that a surface of the wiring board 101 on which the electronic components 111 and 121 are mounted intersects the discharge direction. Further, the wiring board 101 is provided between the front cover 70 and the optical box 50 in the discharge direction. The electronic components 111 and 121 are provided on a surface of the wiring board 101 which is a surface opposite to the optical box 50.

[Circuit Board Configuration]

Figure 3:
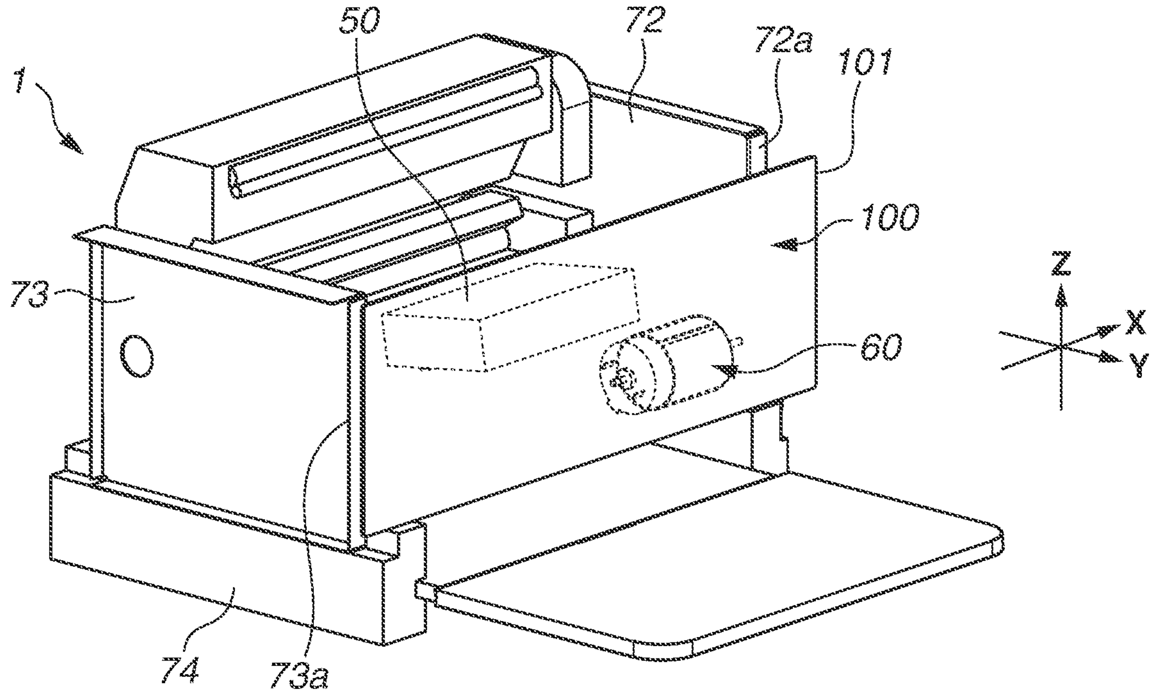
FIG. 3 is a perspective view for illustrating a position of a circuit board.

With reference to FIGS. 3 to 8, a configuration of the circuit board 100 according to the present exemplary embodiment is described in detail. FIG. 3 is a perspective view of the image forming apparatus 1 for illustrating the configuration of the circuit board 100. In FIG. 3, unlike FIG. 1, the front cover 70 and the exterior cover 71 are omitted (for illustration purposes). As illustrated in FIG. 3, the circuit board 100 is installed on the front surface side. Further on the back side of the circuit board 100 (the negative side in the Y-direction), the optical box 50 and a driving motor 60 are provided. In FIG. 3, the optical box 50 and the driving motor 60 are actually at positions where the optical box 50 and the driving motor 60 cannot be seen by the user, and thus are illustrated by dotted lines.

As illustrated in FIG. 3, the image forming apparatus 1 includes a right side plate frame 72 (a first side plate frame), a left side plate frame 73 (a second side plate frame), and a base frame 74. The right side plate frame 72 supports an end portion on the right side (a first end portion) of the photosensitive drum 11 in the X-direction. The left side plate frame 73 supports an end portion on the left side (a second end portion) of the photosensitive drum 11 in the X-direction. The base frame 74 is provided on a bottom surface and supports the right side plate frame 72 and the left side plate frame 73 from below.

The circuit board 100 is supported by these frame members and is mounted on the image forming apparatus 1 such that a board surface of the circuit board 100 is approximately parallel to the XZ plane. The right side plate frame 72 and the left side plate frame 73 are reinforced with bent portions 72*a* and 73*a*, respectively, formed in end portions in the Y-direction of the right side plate frame 72 and the left side plate frame 73. The bent portion 72*a* is bent toward the positive side in the X-direction, to be approximately parallel to the XZ plane. The bent portion 73*a* is bent toward the negative side in the X-direction, to be approximately parallel to the XZ plane. That is, the bent portions 72*a* and 73*a* are bent along the surface of the wiring board 101. Since both side plate frames are thus bent toward outside the image forming apparatus 1 (in directions away from the photosensitive drum 11 in the X-direction), electronic components can be mounted on a larger area of the wiring board 101.

Figure 4:
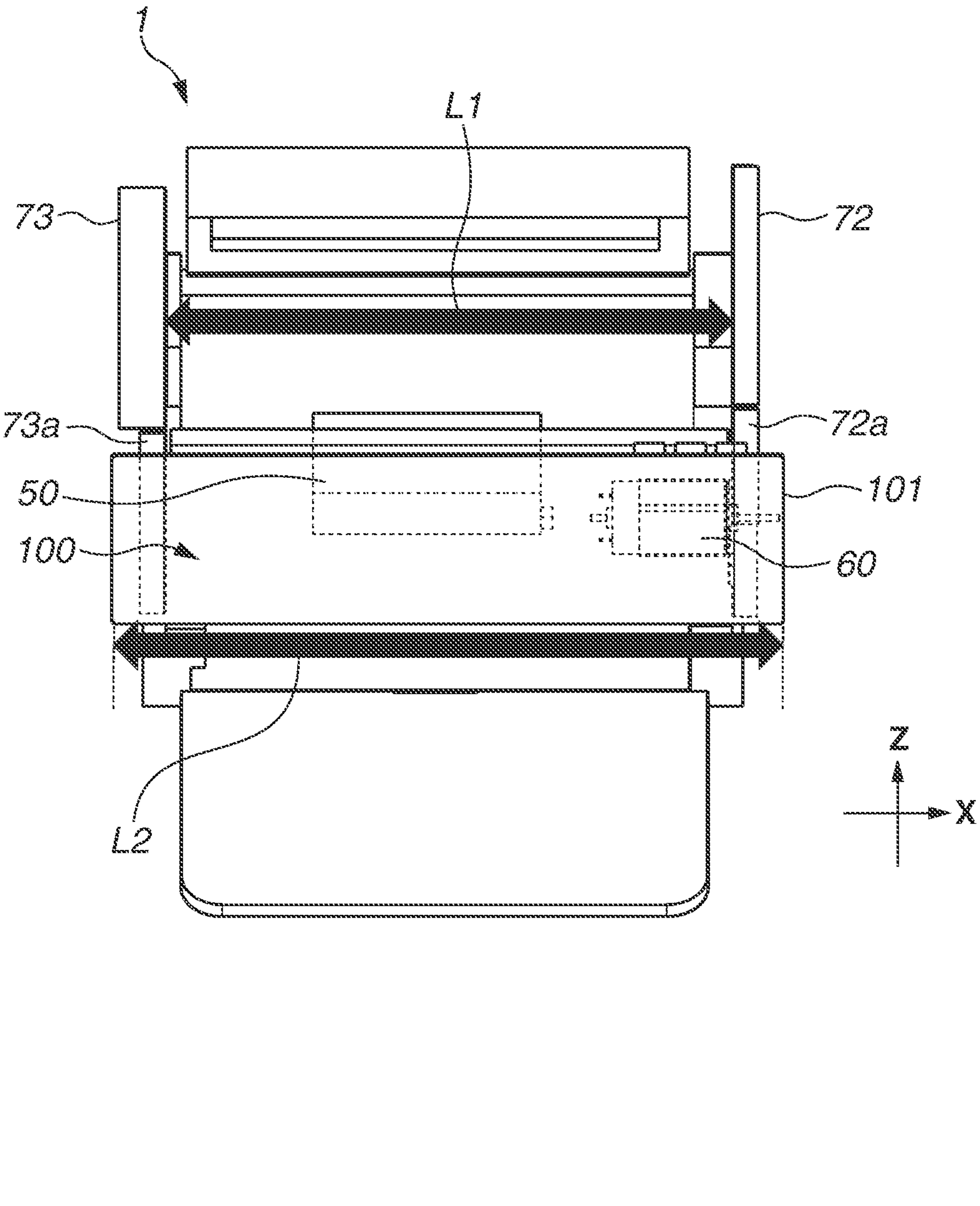
FIG. 4 is a front perspective view for illustrating the position of the circuit board.

FIG. 4 is a front perspective view of the image forming apparatus 1 for illustrating the configuration of the circuit board 100. As illustrated in FIG. 4, a distance L1 between inner surfaces of the right side plate frame 72 and the left side plate frame 73 in the X-direction is shorter than a length L2 of the circuit board 100 in the X-direction. The wiring board 101 is disposed further on the positive side (the front surface side) in the Y-direction than the bent portions 72*a* and 73*a*, and the wiring board 101 is in contact with each of the bent portions 72*a* and 73*a*. When viewed from the front surface side, the circuit board 100 and the bent portions 72*a* and 73*a* overlap each other. In FIG. 4, parts of the bent portions 72*a* and 73*a*, the optical box 50, and the driving motor 60 are actually at positions where the parts of the bent portions 72*a* and 73*a*, the optical box 50, and the driving motor 60 cannot be seen by the user, and thus are illustrated by dotted lines.

<Positional Relationship between Electronic Components and Optical Box>

Figure 5:
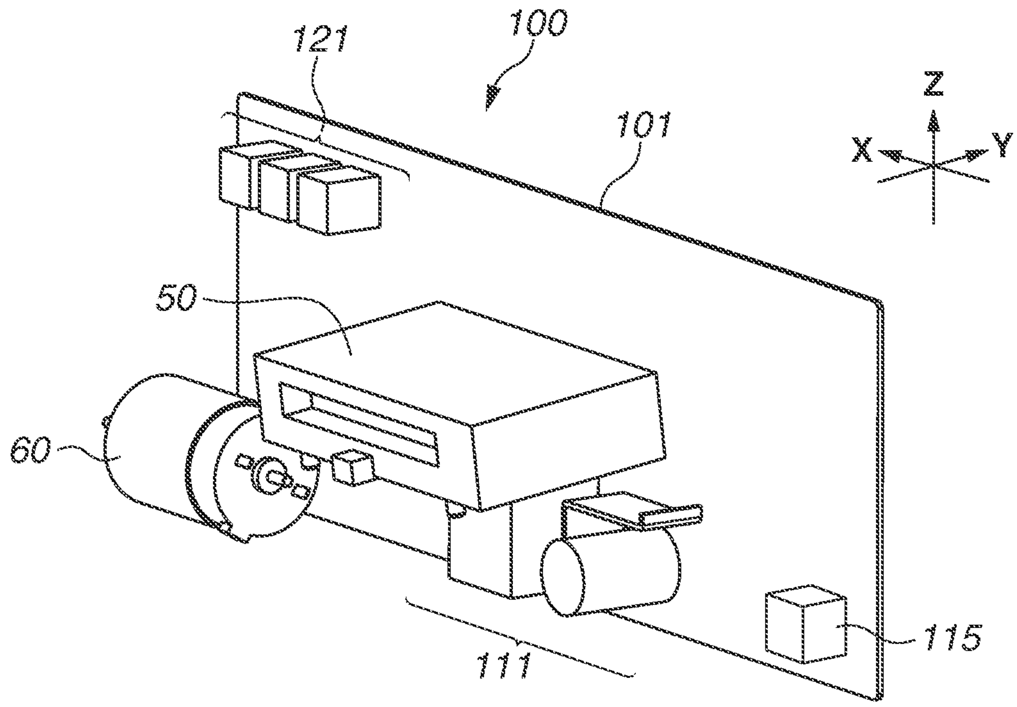
FIG. 5 is a perspective view of the circuit board and peripheral members of the circuit board.
Figure 6:
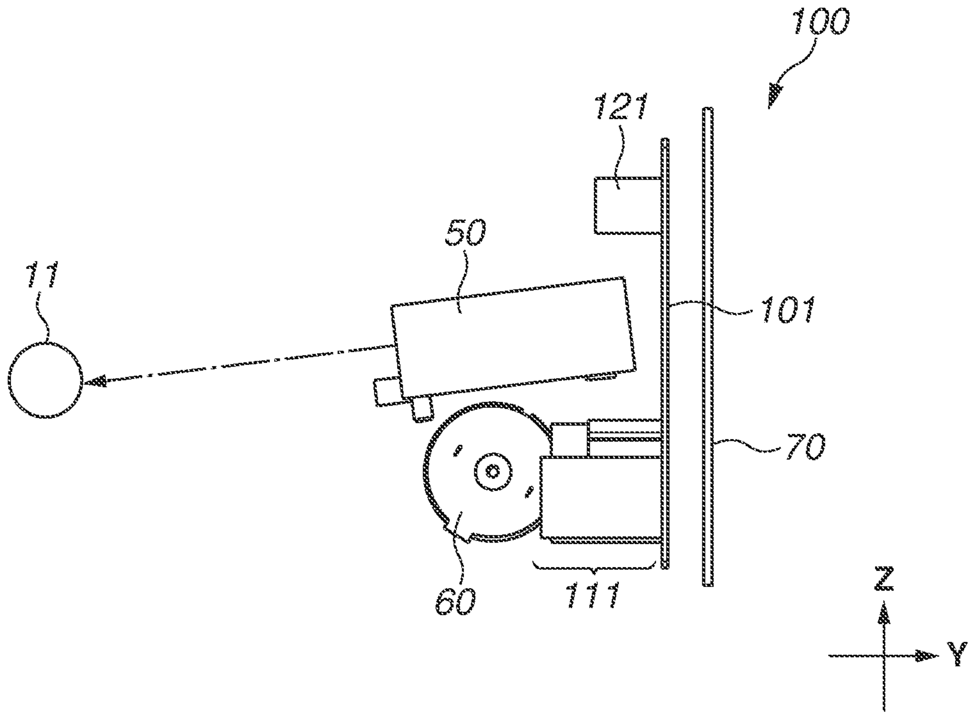
FIG. 6 is a cross-sectional view of the circuit board and the peripheral members of the circuit board.
Figure 7:
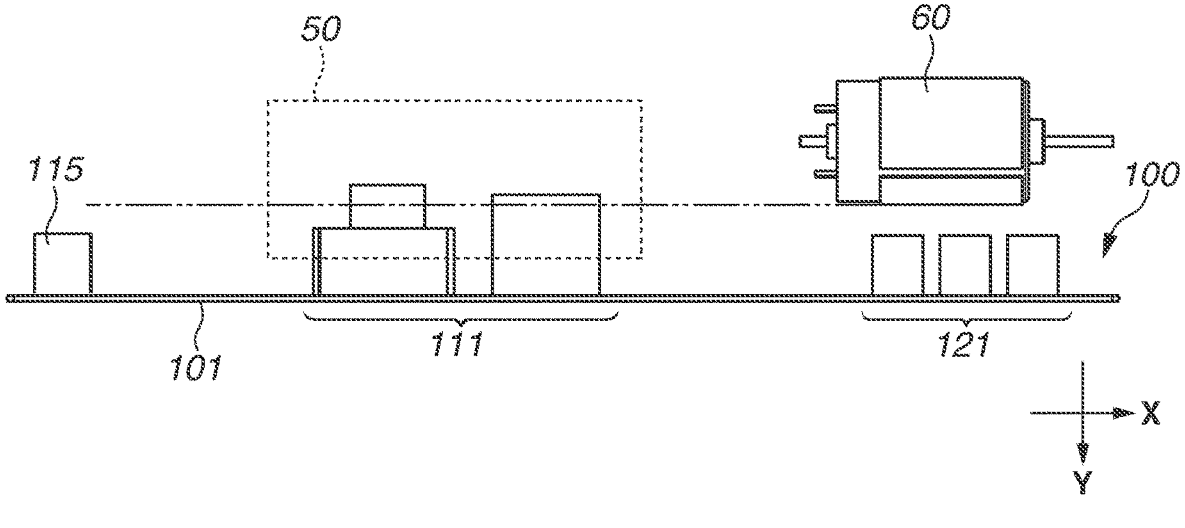
FIG. 7 is a top view of the circuit board and the peripheral members of the circuit board.

Next, with reference to FIGS. 5 to 7, the positional relationship between the electronic components 111 and the optical box 50 is described in detail.

FIG. 5 is a perspective view of the circuit board 100 when viewed from behind a main body of the image forming apparatus 1. To effectively utilize space, the electronic components 111, which are larger in size in the Y-direction than other members, are provided together in a lower portion of the wiring board 101 and are mounted within a range below the optical box 50. More specifically, the electronic components 111 are provided below the center of the wiring board 101 in the vertical direction. In an end portion of the wiring board 101, a power source input unit 115 is provided. The power source input unit 115 is connected to an inlet (not illustrated) and receives supply of power from a commercial power source.

FIG. 6 is an enlarged cross-sectional view of the circuit board 100 when viewed from a left side surface of the main body. The optical box 50 is disposed at an optimal position for emitting laser light indicated by a chain line to the photosensitive drum 11. In a portion where the optical box 50 and the wiring board 101 are closest to each other in the Y-direction, a member protruding greatly from the board surface, such as the electronic components 111, is not disposed. That is, the optical box 50 and the electronic components 111 are disposed at positions shifted from each other in the Z-direction, to avoid interference with each other.

FIG. 7 is an enlarged top view of the circuit board 100 when viewed from an upper surface of the main body. In FIG. 7, the optical box 50 and the electronic components 111 are disposed at positions where the optical box 50 and the electronic components 111 partially overlap each other. As described above, since the optical box 50 is provided above the electronic components 111, normally, the electronic components 111 cannot be seen from this direction. In FIG. 7, to illustrate the positional relationship between the optical box 50 and the electronic components 111 in an easily understandable manner, the electronic components 111 are illustrated in a see-through manner by indicating the optical box 50 by a dotted line.

The electronic components 111 are thus disposed at the above-described position, whereby it is possible to shorten the distance in the Y-direction (the front-back direction) between the circuit board 100 and the optical box 50. Thus, it is possible to downsize the image forming apparatus 1.

<Positional Relationship between Electronic Components and Driving Motor>

Next, with reference to FIGS. 5 and 7, the positional relationship between the electronic components 111 and the driving motor 60 is described in detail. The driving motor 60 functions to rotate members (the pickup roller 3, the feeding roller 5*a*, and the conveying roller pair 5*c*) for feeding and conveying a recording material P and also rotate the photosensitive drum 11.

As illustrated in FIG. 5, the driving motor 60 protrudes to the negative side in the X-direction, and the wiring board 101 is disposed on the front side of the main body with respect to the driving motor 60. It is understood that the electronic components 111 are mounted at positions shifted from the driving motor 60, to avoid interference with the driving motor 60. As illustrated in FIG. 6, when viewed from the left side surface of the main body, the driving motor 60 and the electronic components 111 are disposed at positions where the driving motor 60 and the electronic components 111 partially overlap each other. As illustrated in FIG. 7, when viewed from the upper surface of the main body, the driving motor 60 and the electronic components 111 are disposed at positions shifted from each other in the X-direction, to avoid interference with each other.

The electronic components 111 are thus disposed at the above-described position, whereby it is possible to shorten the distance in the Y-direction (the front-back direction) between the circuit board 100 and the driving motor 60. Thus, it is possible to downsize the image forming apparatus 1.

<Configuration of Attachment to Main Body>

Figure 8:
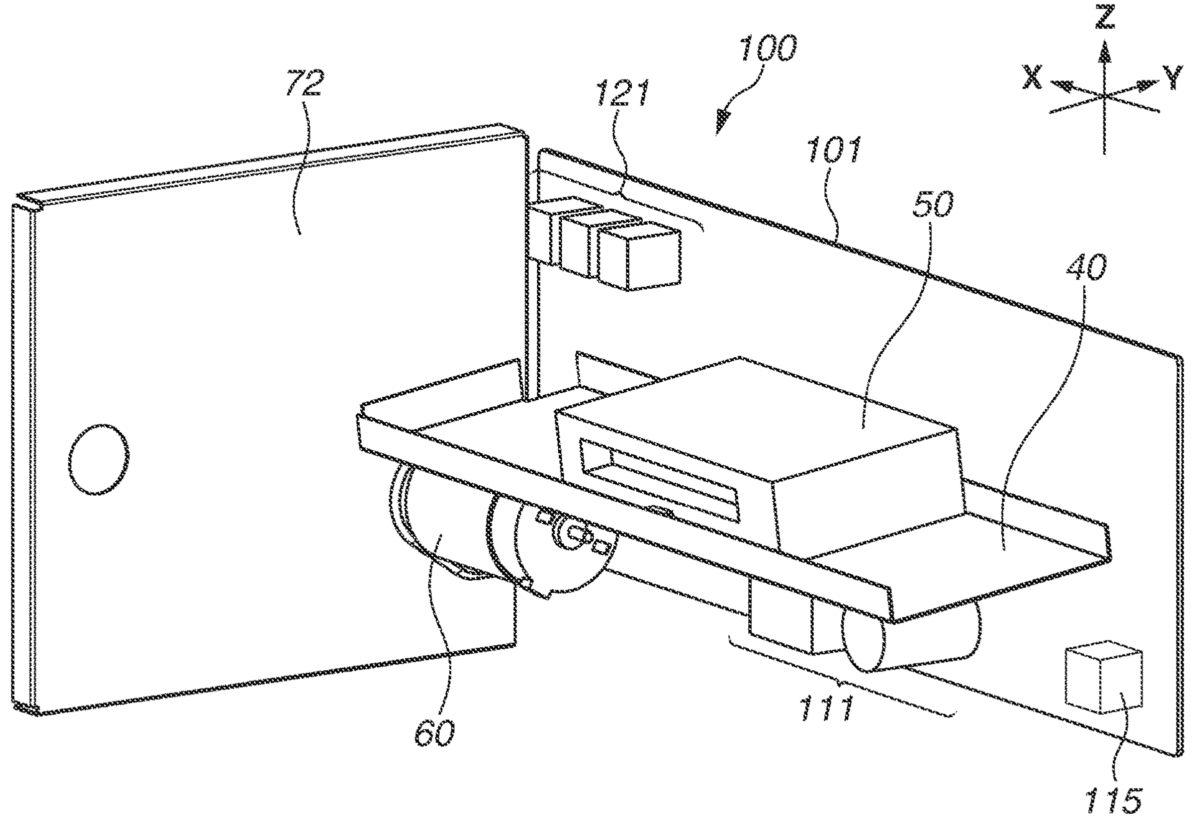
FIG. 8 is a perspective view for illustrating a holding configuration of an optical box and a driving motor.

Next, with reference to FIG. 8, an attachment configuration of the optical box 50 and the driving motor 60 to the main body is described in detail. FIG. 8 is a diagram obtained by additionally illustrating the right side plate frame 72 and a scanner holding member 40 to the perspective view in FIG. 5. The left side plate frame 73 and the base frame 74 are omitted (for illustration purposes).

The optical box 50 is held by the scanner holding member 40. The scanner holding member 40 is fixed to each of the right side plate frame 72 and the left side plate frame 73 (not illustrated in FIG. 8) and configured to bridge the two frames. The driving motor 60 is attached to the right side plate frame 72, and a gear coupled to the driving motor 60 is provided on the positive side (the right side) in the X-direction of the right side plate frame 72. The driving force of the driving motor 60 is transmitted to the feeding roller 5*a* and the photosensitive drum 11 via this gear.

[Configuration of Circuit Board]

Figure 9:
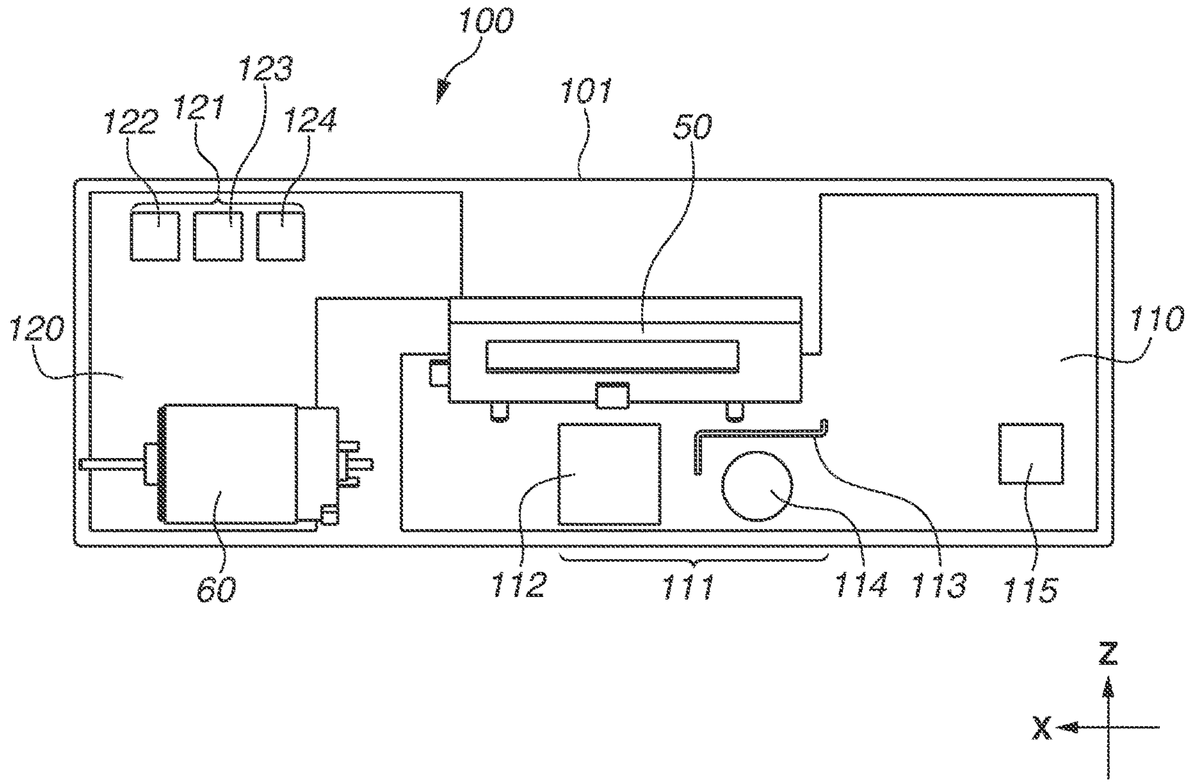
FIG. 9 is a diagram illustrating electronic components on the circuit board.

Next, with reference to FIG. 9, a configuration of the circuit board 100 is described. FIG. 9 is a rear view of the circuit board 100 when viewed from the back side of the main body. FIG. 9 illustrates not only the circuit board 100, and also the optical box 50 and the driving motor 60.

The circuit board 100 includes a low-voltage power source unit 110 that introduces alternating current power from an external commercial power source and converts the alternating current power into direct current power, and a high-voltage power source unit 120 that supplies a high voltage required for the image formation to the process members. In the circuit board 100 according to the present exemplary embodiment, the low-voltage power source unit 110 and the high-voltage power source unit 120 are mounted on the same board.

The low-voltage power source unit 110 includes, as the electronic components 111 that are large in size in the Y-direction, a low-voltage power source transformer 112, a heat sink 113, and an electrolytic capacitor 114. Further, the low-voltage power source unit 110 includes the power source input unit 115. The high-voltage power source unit 120 includes, as the electronic components 121 that are large in size in the Y-direction, a charging transformer 122, a developing transformer 123, and a transfer transformer 124. As is clear from FIG. 9, the electronic components 111 and 121 that are large in size in the Y-direction are both disposed at positions shifted from the positions of the optical box 50 and the driving motor 60.

Figure 10:
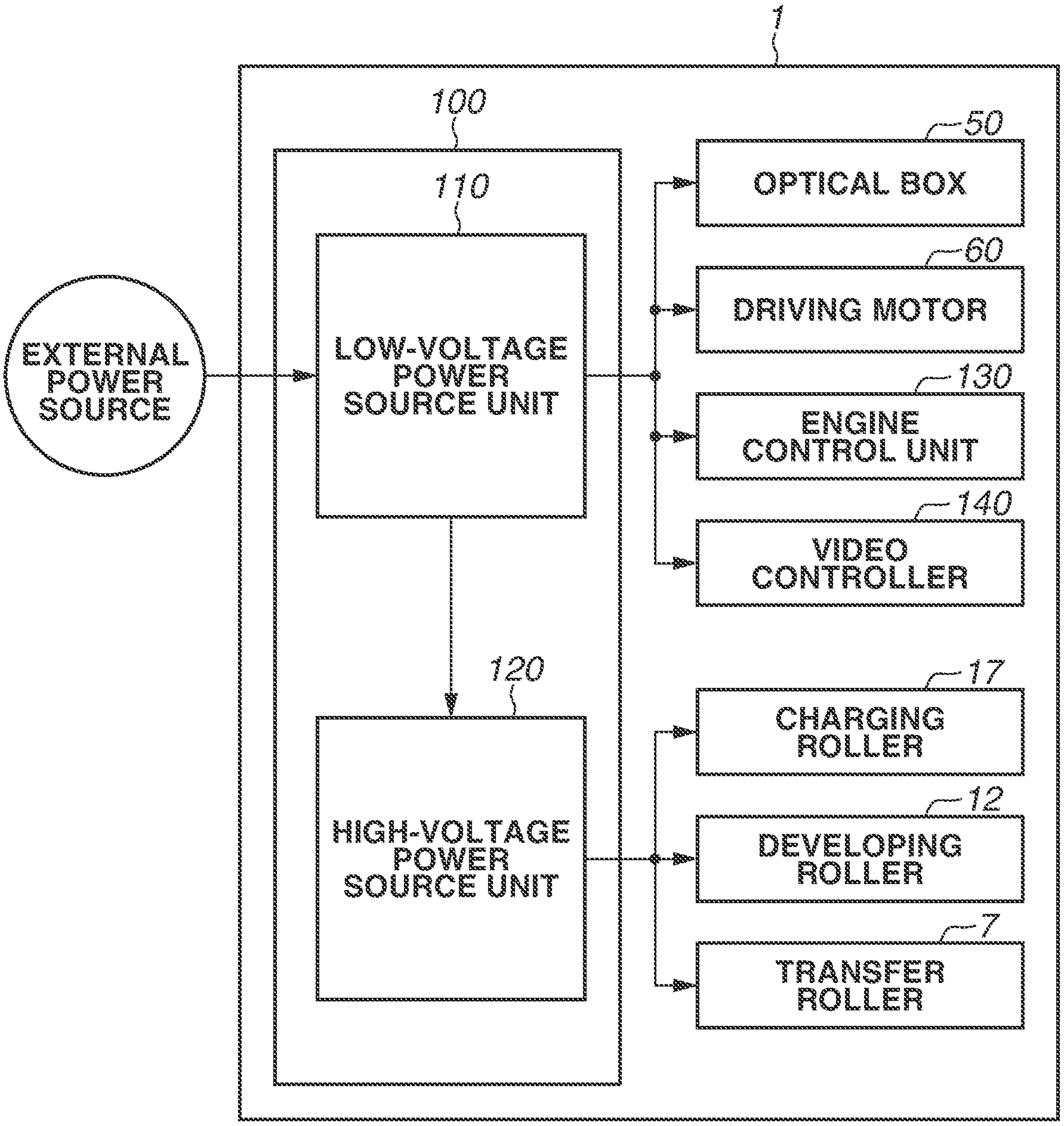
FIG. 10 is a block diagram illustrating a function of the circuit board.

Next, with reference to FIGS. 9 and 10, functions of the low-voltage power source unit 110 and the high-voltage power source unit 120 are described. FIG. 10 is a block diagram illustrating a function of the circuit board 100.

First, the low-voltage power source unit 110 introduces power from an external power source via the power source input unit 115 mounted on an end portion of the circuit board 100 and converts an alternating current voltage into a stable direct current voltage using a rectification smoothing circuit including the electrolytic capacitor 114. Then, the low-voltage power source unit 110 converts the direct current voltage into a high-frequency alternating current voltage using a switching element, such as a transistor and then inputs the high-frequency alternating current voltage to the low-voltage power source transformer 112. The low-voltage power source transformer 112 converts the high-frequency alternating current voltage as an input voltage into an alternating current voltage (an output voltage) having a desired voltage value. The low-voltage power source unit 110 converts the alternating current voltage into a direct current voltage again and outputs the obtained direct current voltage to the high-voltage power source unit 120 and the optical box 50. In the low-voltage power source unit 110, losses of individual circuit components appear as heat. Thus, to dissipate the heat, the heat sink 113 made of aluminum or iron is provided.

The high-voltage power source unit 120 converts the voltage (e.g., 24 V) supplied from the low-voltage power source unit 110 into a high voltage required for the image forming process, such as charging, development, and transfer. The charging transformer 122 converts the voltage supplied from the low-voltage power source unit 110 into a voltage for charging, and then, the converted voltage is supplied to the charging roller 17. The developing transformer 123 converts the voltage supplied from the low-voltage power source unit 110 into a voltage for development, and then, the converted voltage is supplied to the developing roller 12. The transfer transformer 124 converts the voltage supplied from the low-voltage power source unit 110 into a voltage for transfer, and then, the converted voltage is supplied to the transfer roller 7.

The low-voltage power source unit 110 supplies a voltage (e.g., 3.3 V or 5 V) to not only the high-voltage power source unit 120, but also the optical box 50, the driving motor 60, an engine control unit 130, and a video controller 140. The engine control unit 130 functions to perform overall control of the various process members. The engine control unit 130 includes a central processing unit (CPU) (not illustrated), a random-access memory (RAM) (not illustrated) that is used to calculate or temporarily store data required to control the image forming apparatus 1, and a read-only memory (ROM) (not illustrated) that stores a program for controlling the image forming apparatus 1 and various types of data. The engine control unit 130 may be provided on a different board from the circuit board 100, or may be provided on the same board as the circuit board 100. The video controller 140 functions to communicate with an external device, such as a personal computer, receive print data, and notify the engine control unit 130 of a result of analyzing the print data.

Based on the above-described configuration, according to the present exemplary embodiment, it is possible to meet further user demand.

In the above exemplary embodiment, a description has been given of a configuration in which the low-voltage power source unit 110 and the high-voltage power source unit 120 are provided on the same board (the circuit board 100). The present invention, however, is not limited to this. The two power source units may be provided on different boards. Both the board of the low-voltage power source unit 110 and the board of the high-voltage power source unit 120 may be provided on the front surface side of the image forming apparatus 1 illustrated in FIG. 3. Alternatively, only the board of the low-voltage power source unit 110 may be provided on the front surface side, and the board of the high-voltage power source unit 120 may be provided at a different position.

Yet alternatively, only the board of the high-voltage power source unit 120 may be provided on the front surface side, and the board of the low-voltage power source unit 110 may be provided at a different position. In this case, however, it is desirable that the electronic components 121 that are large in size in the Y-direction and are mounted on the high-voltage power source unit 120 should be disposed at positions shifted from the positions of the optical box 50 and the driving motor 60.

In the above exemplary embodiment, a description has been given of a configuration in which, as illustrated in FIG. 4, the distance L1 between the inner surfaces of the right side plate frame 72 and the left side plate frame 73 in the X-direction is shorter than the length L2 of the circuit board 100 in the X-direction. The present invention, however, is not limited to this configuration. For example, the relationship may be such that the distance L1 is greater than or equal to the length L2. Also, the wiring board 101 may be provided further on the negative side (the back surface side) in the Y-direction than the bent portions 72*a* and 73*a*. That is, the wiring board 101 may be provided in an area between the inner surfaces of the right side plate frame 72 and the left side plate frame 73.

In the above exemplary embodiment, as illustrated in FIG. 9, at a position overlapping the optical box 50 when viewed from a back surface of the main body (a position opposed to the optical box 50 in the Y-direction), a part of the low-voltage power source unit 110 is mounted. The present invention, however, is not limited to this. A different circuit, such as the high-voltage power source unit 120, may be mounted, or the circuit board 100 may not be mounted at this position in the first place.

In the above exemplary embodiment, a description has been given using as an example the feeding cassette 4 that can be pulled out of the main body of the image forming apparatus 1. The present invention, however, is not limited to this configuration. A tray that cannot be pulled out of the image forming apparatus 1 and allows the user to directly insert a recording material P through the feeding opening 81 formed in front of the image forming apparatus 1 may be used.

Further, as is clear from FIGS. 1 and 2, the front cover 70 is provided on the same side (the front surface side) as the side where the feeding opening 81 is provided. In the configuration of the present exemplary embodiment, the feeding direction and the discharge direction are opposite to each other, but are in a parallel relationship. Thus, it can also be said that the front cover 70 is located upstream of the optical box 50 in the feeding direction.

In the above exemplary embodiment, as illustrated in FIG. 7, the optical box 50 and the electronic components 111 have the relationship where, when viewed in the vertical direction, the optical box 50 and the electronic components 111 at least partially overlap each other. The present invention, however, is not limited to this. The optical box 50 and the electronic components 111 may be disposed at positions shifted from each other to some extent in the X-direction. That is, the optical box 50 and the electronic components 111 may have the relationship where, when viewed in the vertical direction, the optical box 50 and the electronic components 111 do not overlap each other, but when in from a direction parallel to the XZ plane and intersecting the vertical direction, the optical box 50 and the electronic components 111 at least partially overlap each other. In other words, the optical box 50 and the electronic components 111 may have the relationship where, when viewed in a direction orthogonal to the discharge direction or the feeding direction, the optical box 50 and the electronic components 111 at least partially overlap each other. Even with the above configuration, the distance in the Y-direction (the front-back direction) between the circuit board 100 and the optical box 50 can be shortened, and thus it is possible to downsize the image forming apparatus 1.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus configured to perform an image forming operation, the image forming apparatus comprising:

an optical box including a light source configured to emit light to an image bearing member;

a storage configured to store a recording material; and a housing provided with a discharge opening through which the recording material conveyed from the storage is to be discharged in a discharge direction;

a circuit board configured to convert an alternating current supplied from an external power source into a direct current, wherein the circuit board includes a plurality of electronic components and a wiring board configured to electrically connect the plurality of electronic components, and the circuit board includes a surface of the wiring board on which the plurality of electronic components is mounted;

a first side plate configured to support a first end portion of the image bearing member in a rotation axis direction of the image bearing member; and a second side plate configured to support a second end portion of the image bearing member in the rotation axis direction, wherein the first side plate includes a first bent portion extending along the surface of the wiring board and the rotation axis direction, the second side plate includes a second bent portion extending along the surface of the wiring board and the rotation axis direction, and wherein, the wiring board is supported by the first bent portion and the second bent portion so that a top end of the wiring board and a bottom end of the wiring board are located above the storage with respect to a vertical direction when the image forming operation is performed.

2. The image forming apparatus according to claim 1, further comprising a motor configured to drive the image bearing member, wherein, when viewed in the rotation axis direction of the image bearing member, the motor and the plurality of electronic components partially overlap each other.

3. The image forming apparatus according to claim 2, wherein, when viewed in the vertical direction, the motor and the plurality of electronic components do not overlap each other.

4. The image forming apparatus according to claim 1, wherein a width of the circuit board in the rotation axis direction is longer than a distance between the first side plate and the second side plate in the rotation axis direction.

5. The image forming apparatus according to claim 1, wherein the first bent portion and the second bent portion are bent in directions away from the image bearing member in the rotation axis direction.

6. The image forming apparatus according to claim 1, wherein the plurality of electronic components is provided below a center of the wiring board in the vertical direction.

7. The image forming apparatus according to claim 1, wherein the plurality of electronic components includes at least any one of a capacitor, a transformer, or a heat sink, and wherein the capacitor is configured to smooth an alternating current voltage supplied from the external power source, the transformer is configured to convert an input voltage smoothed by the capacitor and converted into an alternating current voltage again by a switching element into an output voltage to be supplied to the optical box, and the heat sink is provided to dissipate heat of the circuit board.

8. The image forming apparatus according to claim 1, further comprising:

a pick up roller configured to contact the recording material stored in the storage and to rotate to feed the recording material in a feeding direction, wherein the feeding direction is opposite to the discharge direction.

9. The image forming apparatus according to claim 1, wherein the housing includes a downstream end and an upstream end with respect to the discharge direction, and the wiring board is closer to the downstream end than to the upstream end.

10. The image forming apparatus according to claim 1, wherein the surface of the wiring board extends along the vertical direction.

11. The image forming apparatus according to claim 10, wherein the first bent portion and the second bent portion extend along the vertical direction.

12. The image forming apparatus according to claim 1, wherein the circuit board is disposed on a downstream side with respect to the discharge opening in the discharge direction.

13. The image forming apparatus according to claim 1, wherein the circuit board is disposed on an upstream side with respect to the optical box in a direction in which the light is emitted to the image bearing member.

14. An image forming apparatus configured to perform an image forming operation, the image forming apparatus comprising:

an optical box including a light source configured to emit light to an image bearing member;

a storage configured to store a recording material;

a housing provided with a discharge opening through which the recording material conveyed from the storage is to be discharged in a discharge direction;

a circuit board configured to convert an alternating current supplied from an external power source into a direct current, wherein the circuit board includes a plurality of electronic components and a wiring board configured to electrically connect the plurality of electronic components, and the circuit board includes a surface of the wiring board on which the plurality of electronic components is mounted;

a first side plate configured to support a first end portion of the image bearing member in a rotation axis direction of the image bearing member; and a second side plate configured to support a second end portion of the image bearing member in the rotation axis direction, wherein the first side plate includes a first bent portion extending along the surface of the wiring board and the rotation axis direction, the second side plate includes a second bent portion extending along the surface of the wiring board and the rotation axis direction, and a width of the circuit board in the rotation axis direction is longer than a distance between the first side plate and the second side plate in the rotation axis direction, and wherein a top end of the wiring board and a bottom end of the wiring board are located above the storage with respect to a vertical direction when the image forming operation is performed.

15. The image forming apparatus according to claim 14, further comprising a motor configured to drive the image bearing member, wherein, when viewed in the rotation axis direction of the image bearing member, the motor and the plurality of electronic components partially overlap each other.

16. The image forming apparatus according to claim 15, wherein, when viewed in the vertical direction, the motor and the plurality of electronic components do not overlap each other.

17. The image forming apparatus according to claim 14, wherein the first bent portion and the second bent portion are bent in directions away from the image bearing member in the rotation axis direction.

18. The image forming apparatus according to claim 14, wherein the plurality of electronic components is provided below a center of the wiring board in the vertical direction.

19. The image forming apparatus according to claim 14, wherein the plurality of electronic components includes at least any one of a capacitor, a transformer, or a heat sink, and wherein the capacitor is configured to smooth an alternating current voltage supplied from the external power source, the transformer is configured to convert an input voltage smoothed by the capacitor and converted into an alternating current voltage again by a switching element into an output voltage to be supplied to the optical box, and the heat sink is provided to dissipate heat of the circuit board.

20. The image forming apparatus according to claim 14, further comprising:

a pick up roller configured to contact the recording material stored in the storage and to rotate to feed the recording material in a feeding direction, wherein the feeding direction is opposite to the discharge direction.

21. The image forming apparatus according to claim 14, wherein the housing includes a downstream end and an upstream end with respect to the discharge direction, and the wiring board is closer to the downstream end than to the upstream end.

22. The image forming apparatus according to claim 14, wherein the surface of the wiring board extends along the vertical direction.

23. The image forming apparatus according to claim 22, wherein the first bent portion and the second bent portion extend along the vertical direction.

24. The image forming apparatus according to claim 14, wherein the circuit boarding is disposed on a downstream side with respect to the discharge opening in the discharge direction.

25. The image forming apparatus according to claim 14, wherein the circuit board is disposed on an upstream side with respect to the optical box in a direction in which the light is emitted to the image bearing member.

* * * * *